(12) United States Patent
Bentley et al.

(10) Patent No.: US 12,449,774 B2
(45) Date of Patent: Oct. 21, 2025

(54) OVEN HAVING AN IMAGING SYSTEM FOR FOOD PREPARATION

(71) Applicants: BSH Home Appliances Corporation, Irvine, CA (US); BSH Hausgeräte GmbH, Munich (DE)

(72) Inventors: Garrett Bentley, Knoxville, TN (US); Luc Lam, Irvine, CA (US)

(73) Assignees: BSH Home Appliances Corporation, Irvine, CA (US); BSH Hausgeräte GmbH, Munich (DE)

( * ) Notice: Subject to any disclaimer, the term of this patent is extended or adjusted under 35 U.S.C. 154(b) by 827 days.

(21) Appl. No.: 17/738,081

(22) Filed: May 6, 2022

(65) Prior Publication Data
US 2023/0359153 A1 Nov. 9, 2023

(51) Int. Cl.
*G05B 13/02* (2006.01)
*F24C 7/08* (2006.01)
*F27D 21/02* (2006.01)
*G06T 7/62* (2017.01)

(52) U.S. Cl.
CPC ............ *G05B 13/024* (2013.01); *F24C 7/087* (2013.01); *F27D 21/02* (2013.01); *G06T 7/62* (2017.01); *G06T 2207/20081* (2013.01); *G06T 2207/30242* (2013.01)

(58) Field of Classification Search
CPC ..... H05B 1/0263; H05B 6/6447; F24C 7/085; F24C 7/087; G06T 7/62; G06T 2207/20081
See application file for complete search history.

(56) References Cited

U.S. PATENT DOCUMENTS

| 5,504,311 | A | 4/1996 | Dubuis |
| 9,420,641 | B2* | 8/2016 | Corona ................. H05B 6/686 |
| 10,674,569 | B2 | 6/2020 | Luckhardt |
| 10,724,742 | B2 | 7/2020 | Wilson |
| 10,739,013 | B2* | 8/2020 | Bhogal .................. F24C 3/124 |
| 10,760,794 | B2* | 9/2020 | Cheng .................. H05B 6/6452 |
| 2013/0277353 | A1* | 10/2013 | Joseph ................. H05B 1/0263 |
|  |  |  | 219/209 |
| 2013/0306626 | A1* | 11/2013 | Torres ................ B65D 81/3446 |
|  |  |  | 219/635 |

(Continued)

FOREIGN PATENT DOCUMENTS

| CN | 104042124 A | 9/2014 |
| CN | 105125096 A | 12/2015 |

(Continued)

*Primary Examiner* — Thien S Tran
(74) *Attorney, Agent, or Firm* — Michael E. Tschupp; Brandon G. Braun; Andre Pallapies

(57) ABSTRACT

An oven may include an image processing system configured to take images of an interior of a cavity of the oven. Images of the interior of the oven cavity captured by the image processing system are input into a machine learning model trained to identify food items in the image. The oven uses the identity of the food item output by the machine learning model to determine a cooking program for the food item and cooks the food item according to the cooking program. The oven may use the image processing system to monitor the cooking process of the food item and update the cooking program during the cooking process based on the observed progress.

10 Claims, 9 Drawing Sheets

(56) References Cited

U.S. PATENT DOCUMENTS

| | | | | |
|---|---|---|---|---|
| 2015/0289324 A1* | 10/2015 | Rober | | H05B 6/668 |
| | | | | 219/707 |
| 2016/0033140 A1 | 2/2016 | Weaver, Jr. | | |
| 2016/0059412 A1* | 3/2016 | Oleynik | | B25J 19/02 |
| | | | | 700/250 |
| 2017/0105572 A1* | 4/2017 | Matloubian | | F24C 7/082 |
| 2018/0220496 A1* | 8/2018 | Pereira | | H05B 6/6414 |
| 2019/0053332 A1* | 2/2019 | Cheng | | F24C 7/046 |
| 2019/0110638 A1* | 4/2019 | Li | | A47J 36/32 |
| 2020/0025389 A1* | 1/2020 | Erbe | | F24C 15/04 |
| 2020/0053844 A1 | 2/2020 | Erie | | |
| 2020/0208915 A1* | 7/2020 | Käser | | F27D 19/00 |
| 2020/0217512 A1* | 7/2020 | Clayton | | A21B 1/06 |
| 2020/0367692 A1 | 11/2020 | Stipe | | |
| 2021/0080114 A1* | 3/2021 | Liu | | A47J 36/32 |
| 2022/0007884 A1* | 1/2022 | Kling | | G06F 3/0488 |
| 2022/0078889 A1* | 3/2022 | Bhogal | | F24C 7/085 |
| 2022/0117274 A1* | 4/2022 | Bhogal | | A47J 36/32 |
| 2022/0273134 A1* | 9/2022 | Du | | G06V 10/26 |
| 2022/0325896 A1* | 10/2022 | Jeong | | F24C 3/128 |

FOREIGN PATENT DOCUMENTS

| | | | |
|---|---|---|---|
| CN | 205026746 U | 2/2016 | |
| CN | 208988574 U | 6/2019 | |
| CN | 209003639 U | 6/2019 | |
| DE | 29913049 U1 | 11/1999 | |
| DE | 102017203305 A | 9/2018 | |
| WO | 2017020312 A1 | 2/2017 | |
| WO | 2018040339 A1 | 12/2018 | |
| WO | 2020074478 A1 | 4/2020 | |
| WO | WO-2020074474 A1 * | 4/2020 | A23L 5/15 |

* cited by examiner

OVEN HAVING AN IMAGING SYSTEM FOR FOOD PREPARATION

FIELD

This disclosure relates to systems and methods for ovens. More specifically, the disclosed embodiments relate to ovens utilizing imaging systems.

INTRODUCTION

In recent years, camera systems have been implemented in many common household appliances to help monitor and automate processes previously requiring the presence or input of a human user.

SUMMARY

The present disclosure provides systems, apparatuses, and methods relating to ovens including an image processing system utilizing machine learning.

In some embodiments, a method of the present disclosure for cooking a plurality of food items includes: generating an image of an interior of an oven cavity containing a plurality of food items, using an image sensor; using one or more machine learning models trained to output an identity and count of each of the food items based on the image of the interior of the oven cavity; determining a primary food item of the plurality of food items disposed in the oven cavity; selecting a cooking program based on cooking the primary food item; and cooking the multiple food items according to the cooking program selected for the primary food item.

In some embodiments, an oven of the present disclosure includes: an oven body including an oven cavity having one or more heating elements and a selectively openable door; an imaging device coupled to the oven body, such that the imaging device is configured to generate images of an interior of the oven cavity; and an electronic controller configured to selectively control the one or more heating elements to heat the oven cavity, the electronic controller including processing logic configured to: use one or more machine learning models trained to output an identity and count of each of several food items disposed in the oven cavity, based on one or more images of the interior of the oven cavity generated by the imaging device; determine a primary food item of the plurality of food items disposed in the oven cavity; select a cooking program based on cooking the primary food item; and cook the several food items according to the cooking program selected for the primary food item.

Features, functions, and advantages may be achieved independently in various embodiments of the present disclosure, or may be combined in yet other embodiments, further details of which can be seen with reference to the following description and drawings.

DETAILED DESCRIPTION

Figure 1:
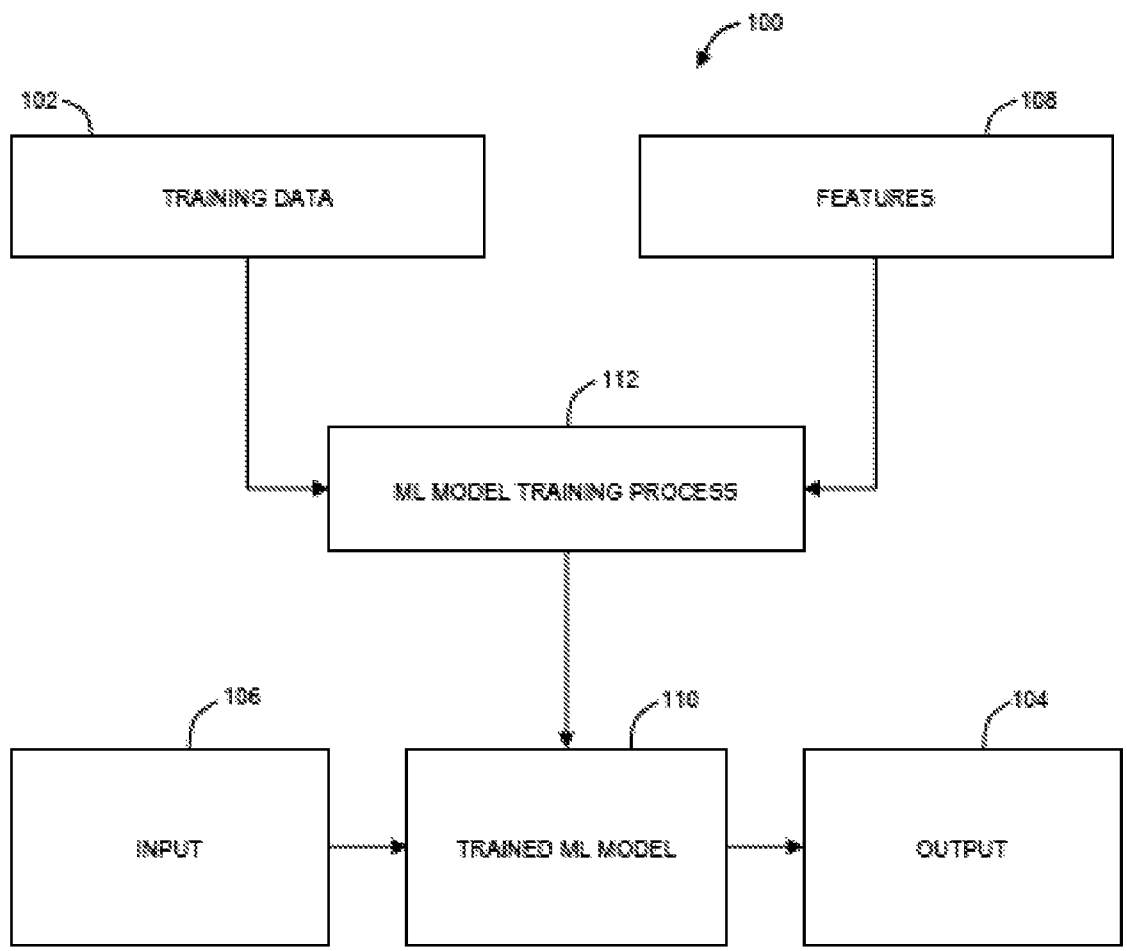
FIG. 1 is a schematic diagram of an illustrative machine learning model in accordance with aspects of the present disclosure.

Various aspects and examples of an oven utilizing machine learning, as well as related methods, are described below and illustrated in the associated drawings. Unless otherwise specified, an oven in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Coupled" means connected, either permanently or releasably, whether directly or indirectly through intervening components.

"Processing logic" describes any suitable device(s) or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

A "controller" or "electronic controller" includes processing logic programmed with instructions to carry out a controlling function with respect to a control element. For example, an electronic controller may be configured to receive an input signal, compare the input signal to a selected control value or setpoint value, and determine an output signal to a control element (e.g., a motor or actuator) to provide corrective action based on the comparison. In another example, an electronic controller may be configured to interface between a host device (e.g., a desktop computer, a mainframe, etc.) and a peripheral device (e.g., a memory device, an input/output device, etc.) to control and/or monitor input and output signals to and from the peripheral device.

Directional terms such as "up," "down," "vertical," "horizontal," and the like should be understood in the context of the particular object in question. For example, an object may be oriented around defined X, Y, and Z axes. In those examples, the X-Y plane will define horizontal, with up being defined as the positive Z direction and down being defined as the negative Z direction.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, an oven in accordance with the present teachings utilizes an image processing system including an image sensor disposed within a cavity of the oven, and one or more machine learning (ML) models trained to identify food items in images of the oven cavity taken by the image sensor. The oven matches the food item identified by the trained ML model to one or more corresponding cooking programs for the food item, and suggests a cooking program to a user of the oven. The image processing system is used by the oven to monitor the food item during the cooking process, such as to update the cooking program based on the observed progress of the item being cooked.

The image processing system has at least one image sensor or camera configured to take images of an interior of the oven cavity. The image sensor may be permanently or removably coupled to the interior of the oven cavity or a door of the oven. In some examples, the image sensor is disposed outside of the oven cavity but has a field of view covering the interior of the oven cavity. The camera is disposed and oriented such that the image sensor can obtain a three-dimensional (3D) view, such as an isometric, dimetric, or trimetric view of the interior of the oven cavity. For example, the image sensor may be pointed at an oblique angle relative to the generally cuboidal interior of the oven. In some examples, the image processing system includes a plurality of image sensors each configured to take images of the interior of the oven cavity.

Images of the interior of the oven cavity are input into the trained ML model, and the trained ML model detects items in the image and outputs an identity of a food item or items detected in the image. The trained ML model may identify cookware containing or holding the food items, and any foreign objects (i.e., items the ML model does not identify as food items or cooking vessels) within the oven cavity. The oven uses the information regarding the identity of the food items in the oven cavity and/or the cooking vessel(s) containing the food items to determine an appropriate cooking program for the food items. Determining a cooking program for a food item may include determining a cooking mode (bake, broil, grill, etc.), a cooking temperature, a cooking duration, a time-based cooking algorithm (e.g., a changing temperature profile over time), and/or a condition-based cooking algorithm (e.g., having step-triggering criteria such as a level of browning) for the food item. In some cases, such as when lidded cookware is used, food items within the cookware are not visible for identification by the ML model. In these situations, the oven may identify the cookware and store information regarding food items commonly cooked in the specific lidded cookware. Cooking programs may then be suggested based on the food items commonly contained in the lidded cookware.

The image processing system is configured to identify the food items present in the oven, and to determine the number or count of each individual food item. In some examples, the image processing system is configured to distinguish similar and dissimilar food items within the oven cavity. "Similar" or "same" food items include, for example, multiple (e.g., three) chicken breasts, or two potatoes (e.g., one small and one large). "Dissimilar" or "different" food items include, for example, a steak and a potato, or a chicken breast and two cobs of corn. This allows a user to place multiples of a same food item and/or different food items into the oven cavity for baking or cooking simultaneously. The image processing system and ML model determines the identity and count of each item, as well as an appropriate cooking program for each item. If dissimilar food items are simultaneously placed into the oven cavity to be cooked, the image processing system may identify each food item individually and determine which of the food items is a primary food item (e.g., a food item that may cause illness if undercooked, and/or food item that requires a long cooking time), and which of the food items are secondary food items (e.g., food items that are not dangerous if undercooked, and/or require less cooking time than the primary food items). In this example, the oven determines the cooking program for the primary food items and finishing times for the secondary food items based on the cooking program for the primary food items.

In some examples, the image processing system determines the quantity in terms of mass and/or volume of the individual food items in the oven cavity, and uses the information to determine an appropriate cooking program for the given food item. To facilitate this feature, a reference geometry object (RGO) (also referred to as a reference object and/or a geometric reference object) is disposed within the oven cavity to provide the system with a reference having a known size. Using the known size of the RGO and an apparent size of the RGO in a field of view of the image sensor the image processing system determines an exact position of the RGO within the oven cavity. The RGO may be mounted on a rack of the oven, mounted to specific cookware for the oven, and/or mounted to any other suitable surface within the oven cavity, such that the RGO is disposed adjacent any food items to be cooked in the oven cavity. In some examples, the oven uses the known distance between gratings in the oven rack as the RGO. In some examples, the RGO is a known object mounted in a known position (e.g., on a rack of the oven), and the oven rack has a finite set of known positions within the oven cavity, such that the image processing system determines oven rack position based on the apparent size of the RGO in the field of view of the image sensor. By imaging the RGO and comparing the known size and position of the RGO to the apparent size and position of the food item(s) within a field of view of the image sensor, the image processing system estimates the volume of each food item. The oven uses the determined volume and identity of the food item to estimate a mass of the food item. The mass of the food item may be useful, for example, in determining a cooking time and cooking temperature for the food item. In some examples, the oven includes a mass sensor configured to directly measure the mass of the food item.

The oven may be configured to request from the user their finished preference(s) for the food item, also referred to herein as one or more finishing criteria. The oven uses the identity and mass of the food item to determine the appropriate cooking program that will accomplish the user's finished preference(s). The finished preferences may include a level of doneness (e.g., rare, medium, well done), a level of brownness, a specific temperature of the food item, and/or any other suitable indicator configured to measure progress of a food item being cooked. If multiple food items are identified in the oven cavity, the oven may request the user's finished preference for each item individually.

The oven may monitor the cooking progress of the food item after the food item begins to be cooked. Some food items undergo predictable changes in volume, mass, and/or brownness level throughout the cooking process. The image processing system is configured to measure or detect the brownness level, volume, and/or mass of the food item, and detect changes throughout the cooking process. In some examples, the oven has a temperature sensor or temperature probe configured to be inserted into the food item to monitor the changing temperature of the food item throughout the cooking process. The cooking temperature and/or cooking time for the food item may be adjusted dynamically and automatically, based on changes in the brownness level, volume, mass, and/or temperature of the food item during the cooking process.

In some examples, live images provided by the image sensor during the cooking process may be displayed on a user interface (UI) disposed on the oven, and/or on a mobile device of the user. In some examples, the oven includes a lighting element configured to provide lighting within the oven cavity, such that a user of the oven can accurately determine the brownness level or color of the food item(s) in the live images of the oven cavity. Displaying the live color images of the food item(s) during the cooking process allows the user of the oven to view the cooking progress of the food item(s) and determine when the food item(s) are cooked to the user's finished preference, without needing to open a door of the oven.

In some examples, the image processing system and trained ML model are configured to detect foreign objects in the oven cavity. For example, the image processing system may detect an item in the oven cavity, but the item cannot be identified as a food item by the trained ML model. In these situations, the oven may be configured to take some action, such as notifying the user of the detected foreign object and/or pausing operation until the item is removed or manually identified. In some examples, the oven stores a list of items left in the oven after a previous cooking procedure, and notifies the user of these items prior to starting a subsequent cooking procedure. In some examples, the oven does not begin a cooking procedure if it has detected a foreign object in the oven cavity until the foreign object is removed or otherwise confirmed by the user as an item to be cooked by the oven.

In some examples, the image processing system is configured to detect a buildup of debris on the interior of the oven cavity, e.g., caused by food spills or general use of the oven. If left in place, debris may be burned onto the interior of the oven cavity, causing damage to the oven. Using the image processing system and trained ML model, the oven is configured to detect the buildup of debris and, in response, to activate a self-cleaning cycle to clean the interior of the oven. The oven may automatically activate the self-cleaning cycle in response to detecting the buildup of debris at a threshold level, and/or may notify the user of the oven of the debris and prompt the user to activate the self-cleaning cycle. In some examples, the self-cleaning cycle includes a pyrolytic cleaning cycle in which the oven interior is heated to temperatures in excess of 800 degrees Fahrenheit (F). Because of the high temperature in the oven cavity during these self-cleaning cycles, items left within the oven cavity (such as oven racks, and cookware) can be deformed or otherwise damaged. To avoid damaging items left in the oven cavity, the image processing system and trained ML model are configured to detect any such items prior to activating the self-cleaning cycle. The oven may warn the user of any items in the oven cavity and request the removal of the items prior to activating the self-cleaning cycle. The oven may be configured to activate the self-cleaning cycle only after the items are removed from the oven cavity. In some examples, the user is allowed to bypass this feature with the assumption that any damage to items left in the oven cavity would be the responsibility of the user.

The oven may store one or more machine learning modules and data for the cooking programs locally in the memory of the oven's data processing system, and/or in the cloud. The oven may also store information regarding user food preferences, commonly cooked dishes and cookware used by the user, time elapsed since the last self-cleaning cycle, buildup of debris in the oven cavity interior, etc.

The user of the oven may interact with the oven through a human-machine interface (HMI), or user interface (UI) disposed on the oven, on an app on a mobile device, and/or in any other suitable medium. In some examples, the oven alerts the user when the food item is finished cooking and/or provides current images of the food item to the user through the app on the mobile device, such that the user can monitor the cooking process while away from the oven.

Examples, Components, and Alternatives

The following sections describe selected aspects of illustrative ovens as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Machine Learning Algorithm

As shown in FIG. 1, this section describes the training or use of an illustrative machine learning algorithm or model 100 suitable for use with ovens of the present disclosure.

In general, machine learning (ML) models (AKA ML algorithms, ML tools, or ML programs) may be utilized to generate estimates, predictions, or decisions that are useful in themselves and/or in the service of a more comprehensive program. ML algorithms "learn" by examples, based on existing sample data, and generate a trained model. Using the trained model, predictions or decisions can then be made regarding new data without explicit programming. Machine learning therefore involves algorithms or tools that learn from existing data and make predictions about novel data.

Training data 102 (e.g., labeled training data) is utilized to build trained ML model 100, such that the ML model can produce a desired output 104 when presented with new data 106. In general, the ML model uses labeled training data 102, which includes values for the input variables and values for the known correct outputs, to ascertain relationships and correlations between variable or features 108 to produce and algorithm mapping the input values to the outputs.

Supervised learning methods may be utilized for the purposes of producing classification or regression algorithms. Classification algorithms are typically used in situations where the goal is categorization (e.g., whether a photo contains a cat or a dog). Regression algorithms are typically used in situations where the goal is a numerical value (e.g., the market value of a house).

Features 108 may include any suitable characteristics capable of being measured and configured to provide some level of information regarding the input scenario, situation, or phenomenon. For example, if the goal is to provide an output relating to the market value of a house, then the features may include variables such as square footage, postal code, year built, lot size, number of bedrooms, etc. Although these example features are numeric, other feature types may be included, such as strings, Boolean values, etc.

Different ML techniques may be used, depending on the application. For example, artificial neural networks, decision trees, support-vector machines, regression analysis, Bayesian networks, genetic algorithms, random forests, and/or the like may be utilized to produce the trained ML model.

Trained ML model 110 is produced by training process 112 based on identified features 108 and training data 102. Trained ML model 110 can then be utilized to predict a category or decide an output value 104 based on new data 106.

With respect to the present disclosure, one or more ML models may be trained and used to detect and identify food items, cooking vessels containing food items, foreign object(s), and/or a buildup of debris in an oven cavity. In some examples, the oven includes multiple ML models each configured to detect and identify one or more of the different types of items in the oven cavity. In some examples, the oven may include one ML model configured to detect and identify several different types of items expected to be in the oven cavity. Training data for one or more of the ML models may include labeled images of food items, common cooking vessels containing food items, non-food items, and/or a buildup of debris in the oven cavity, such that the ML model is trained to identify the presence and identity of individual food items, cooking vessels, non-food items, and/or buildup of debris in the images of the oven cavity. For example, one or more of the trained ML models may receive as input an image of the oven cavity and output an identity of a food item, an identity of cooking vessels containing food items, a detection of a non-food item, and/or a detection of a selected level of debris buildup in the image of the oven cavity.

B. Illustrative Oven Controls

Figure 2:
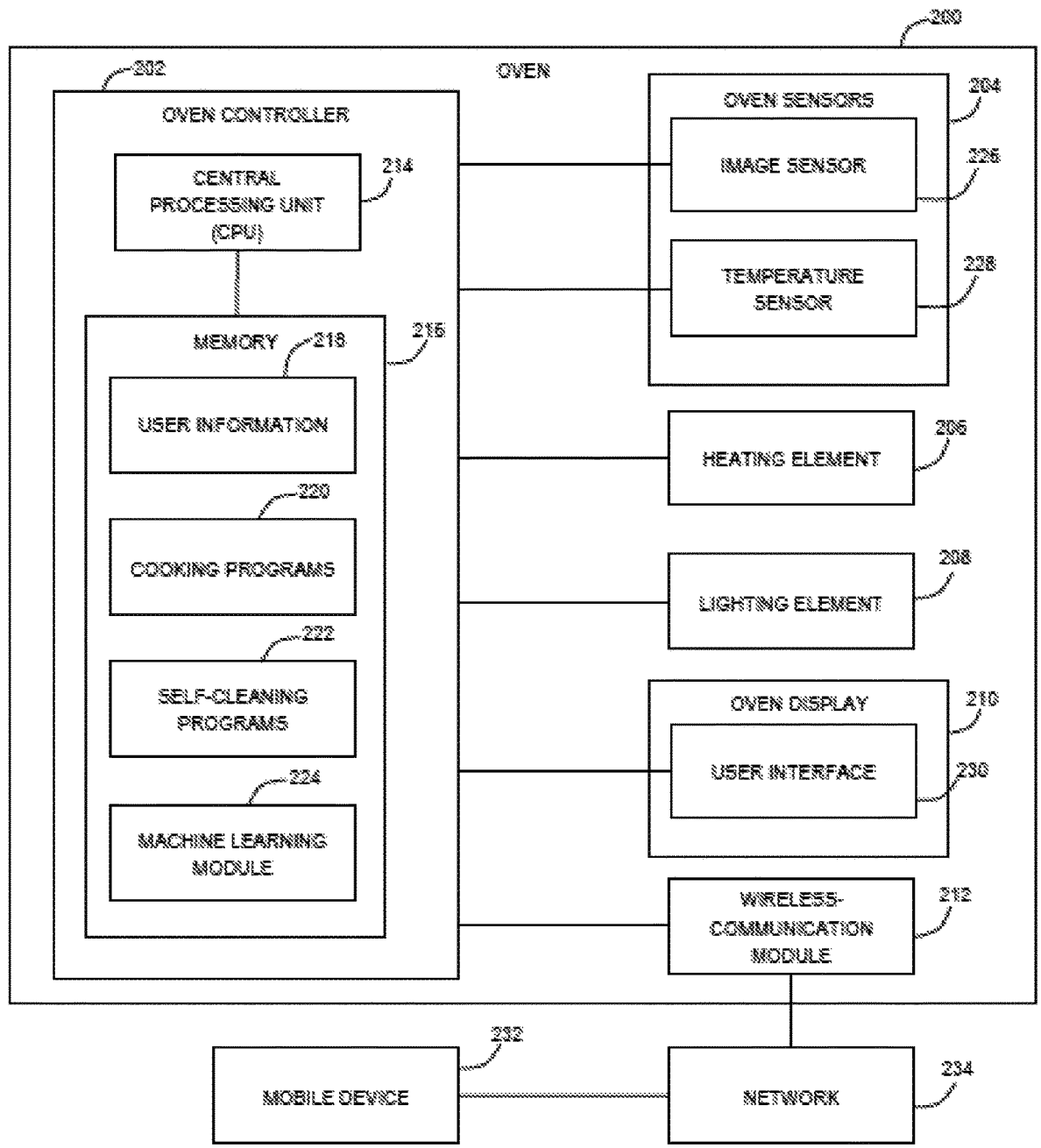
FIG. 2 is a schematic diagram of selected controller inputs and outputs of an illustrative oven in accordance with aspects of the present disclosure.

As shown in the schematic diagram of FIG. 2, this section describes the control system of an illustrative oven 200. Oven 200 is an example of the ovens described in the Overview above.

Oven 200 includes an oven controller 202, oven sensors 204, a heating element 206, a lighting element 208, an oven display 210, and a wireless communications module 212. Oven controller 202 is in communication with oven sensors 204, heating element 206, lighting element 208, oven display 210, and wireless-communications module 212, and is configured to provide controlling outputs and/or receive informational inputs from these components.

Oven controller 202 has a central processing unit 214 and memory 216. Memory 216 stores information for the operation of the oven, and central processing unit 214 uses the information in memory 216 to selectively control the features of oven 200. Memory 216 may store user information 218, one or more cooking programs 220, one or more self-cleaning programs 222, and one or more machine learning modules 224. Each machine learning module 224 comprises processing logic including one or more machine learning models trained to identify and/or count food items, foreign objects, cooking vessels, and/or buildup of debris in a cavity of the oven. In some examples, machine learning module 224 is configured to receive image data of the oven cavity taken by an image sensor or camera 226 and input the image data into one or more of the trained machine learning models. The one or more trained machine learning models output identified items in the images of the oven cavity and the one or more machine learning modules 224 may transmit the output to various components of oven 200.

Oven sensors 204 may include image sensor 226 and a temperature sensor 228. Image sensor 226 may include any device suitable for imaging an interior cavity of the oven, such as a digital camera. Temperature sensor 228 may include a temperature probe configured to be inserted into a food item in the oven, and to provide an internal temperature of the food item. Heating element 206 is configured to heat the oven cavity, and lighting element 208 is configured to illuminate the oven cavity. Lighting element 208 is configured to provide lighting within the oven cavity, such that a user of the oven can view an image of a food item in the oven cavity taken by image sensor 226 and determine a level of brownness of the food item without opening a door of the oven.

Oven display 210 may include a user interface 230 (UI) disposed on the oven. User interface 230 is configured to display information regarding food items identified by the machine learning module, suggested cooking programs for the identified food items, cooking progress of food items, etc. In some examples, user interface 230 is a touch screen, and a user of the oven can interact with the oven through the user interface. In some examples, the user may interact with the oven using voice or gesture command, or through an app on a mobile device 232. Wireless communications module 212 connects to the app on the user's mobile device via network 234. In some examples, the user receives and sends information regarding identified food items and suggested cooking programs for the food items through the app on mobile device 232 to oven 200.

C. Illustrative Oven

Figure 3:
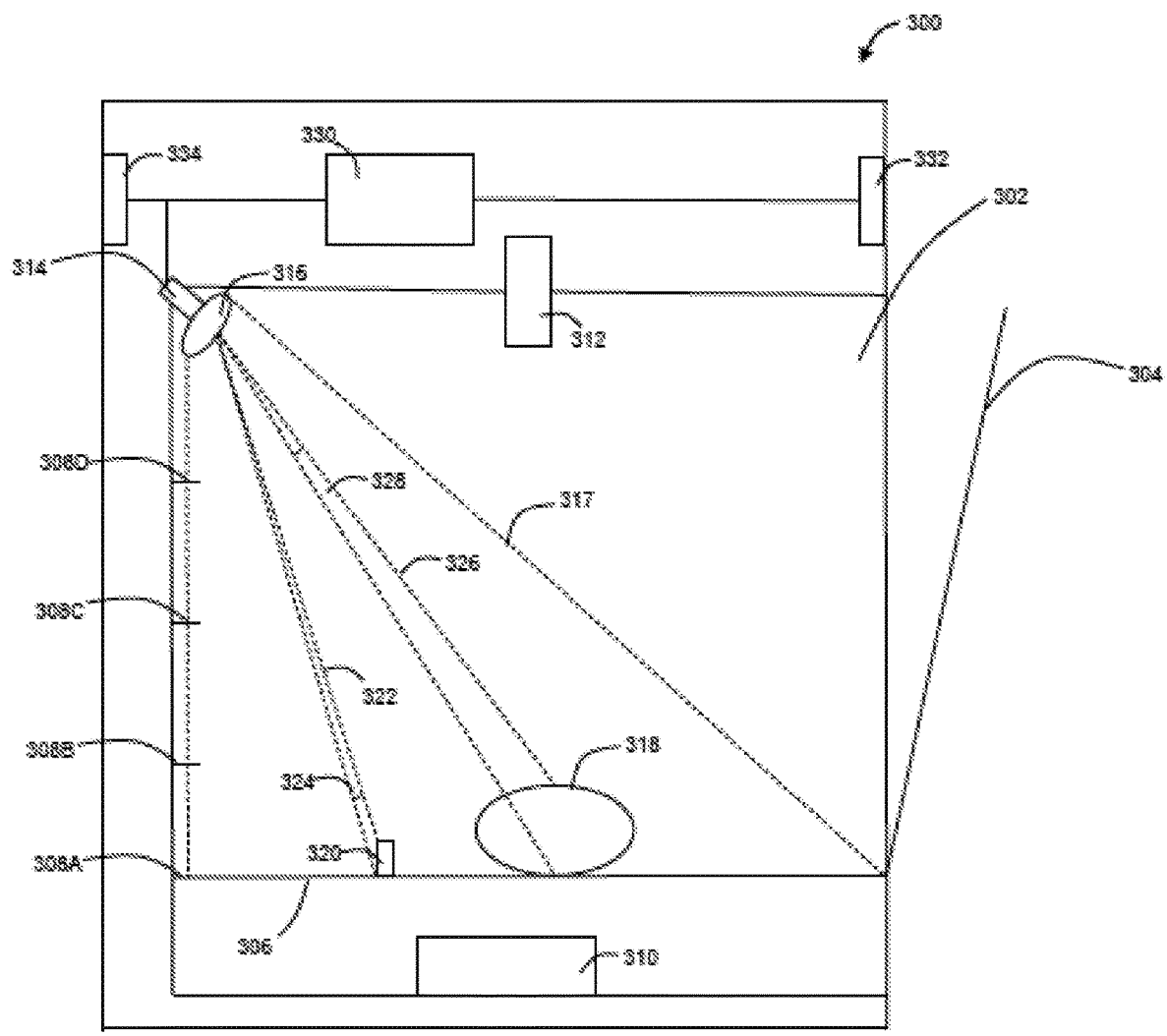
FIG. 3 is a schematic diagram of a side view of an illustrative oven in accordance with aspects of the present disclosure.

As shown in FIG. 3, this section describes an illustrative oven 300, oven 300 is an example of ovens described above.

Oven 300 includes an oven cavity 302, an oven door 304, and an oven rack 306. In FIG. 3, oven rack 306 is depicted in a lowest rack position 308A in the oven. However, oven rack 306 may be positioned in any of positions 308B-D. Oven 300 further includes a heating element 310, a lighting element 312, and an image processing system 314. Heating element 310 is configured to heat the interior of oven cavity 302 and lighting element 312 is configured to provide standardized lighting within oven cavity 302.

Image processing system 314 has an image sensor 316 configured to take images of an interior of oven cavity 302. As shown in FIG. 3, image sensor 316 is mounted to the interior of oven cavity 302, but in some examples the image sensor may be mounted to oven door 304. Image sensor 316 has a field of view 317 and is positioned such that image sensor 316 has a 3D view of the interior of oven cavity 302. In some examples, the image processing system has a plurality of image sensors each configured to take images of the interior of the oven cavity. Disposed on oven rack 306 is a food item 318 and a reference geometry object (RGO) 320. RGO 320 is mounted to rack 306 and has a known size and a finite number of known positions within the oven cavity. In some examples, an RGO is mounted to a cooking vessel or to an interior surface of the oven cavity. Food item 318 may be a food item, a plurality of food items, or a cooking vessel or cookware containing a food item or a plurality of food items.

In some examples, image processing system 314 determines a volume of food item 318 using the known position, and size of RGO 320. Image processing system 314 first determines a distance 322 to RGO 320 and a reference angle 324 representing a height of the RGO in field of view 317 of image sensor 316. Because the height of the RGO is known, the image processing system can determine the oven rack position based on reference angle 324 and distance to RGO 320. Using the determined rack position the image processing system determines a distance 326 to food item 318 and a reference angle 328 representing a height of the food item above the oven rack. By comparing distance 322 and reference angle 324 of RGO 320 to distance 326 and reference angle 328 of food item 318, the image processing system estimates the volume of food item 318. This information is useful in cooking procedures involving determining the appropriate cooking program for item 318.

Oven 300 includes a controller 330, a user interface 332, and a wireless-communication module 334. User interface 332 is configured to display cooking information to the user and to receive input from the user of the oven regarding cooking of item 318. Wireless-communication module 334 is configured to connect to a network to receive information regarding cooking programs or to connect to a user's mobile device. In some examples, wireless-communication module 334 connects to the user's mobile device to display information to the user and receive information from the user regarding cooking of item 318 through a mobile app.

D. Illustrative Method for Food Item Identification

Figure 4:
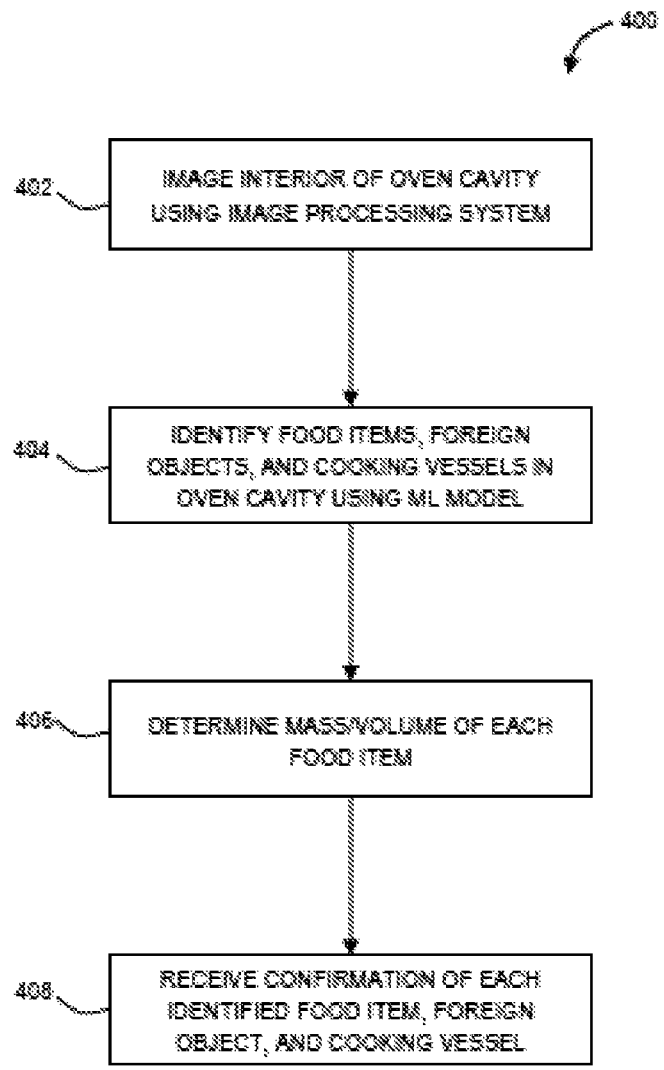
FIG. 4 is a flowchart depicting steps of an illustrative method for identifying food items using a machine learning model in accordance with aspects of the present disclosure.

This section describes steps of an illustrative method 400 for identifying food items within an oven cavity using an image processing system and machine learning model; see FIG. 4. Aspects of oven 300 may be utilized in the method steps described below. Where appropriate, reference may be made to components and systems that may be used in carrying out each step. These references are for illustration, and are not intended to limit the possible ways of carrying out any particular step of the method.

FIG. 4 is a flowchart illustrating steps performed in an illustrative method, and may not recite the complete process or all steps of the method. Although various steps of method 400 are described below and depicted in FIG. 4, the steps need not necessarily all be performed, and in some cases may be performed simultaneously or in a different order than the order shown.

Step 402 of method 400 includes imaging an interior of a cavity of an oven using an image processing system. The image processing system includes an image sensor or camera configured to take images of the interior of the oven cavity, and a lighting element may be used to illuminate the oven cavity.

Step 404 of method 400 includes identifying food items, foreign objects, and/or cooking vessels in the oven cavity using one or more machine learning (ML) models. The image of the interior of the oven cavity taken in step 402 of method 400 is input into the one or more ML models and the one or more ML models are trained to output an identity and/or count of any food items, foreign objects (objects in the oven cavity that are not identified as a food item or a cooking vessel), and/or the identity of any cooking vessel containing the food items in the image. In some examples, the oven includes a plurality of independent ML models each trained to detect specific items or categories of items in the oven cavity. In some examples, a single ML model is trained to detect several different types of items in the oven cavity.

Identified cooking vessels may be a sheet pan, pot, casserole dish, etc. In some examples, no cooking vessel is detected, and the ML model identifies only food items in the oven cavity. The one or more ML models trained to identify food items in the oven cavity are configured to identify single food items, and multiple food items in the oven cavity. If multiple food items are detected in the oven cavity the one or ML models identify each of the food items individually. The one or more trained ML models may be stored locally in a memory of the oven, and/or in the cloud and connected to via a wireless-communications module of the oven.

Step 406 of method 400 includes determining a volume and a mass of each food item. The image processing system is configured to determine the volume of each food item using a reference geometry object (RGO) disposed within the oven cavity and having a known size. The image processing system determines a position of the RGO based on the known size of the RGO and the apparent size of the RGO within a field of view of the image sensor. The image processing system determines the volume of each food item in the oven cavity by comparing the position and size of the RGO in the field of view of the image sensor to an apparent position and size of each food item relative to the RGO. Mass of each item is determined using the identity of the food item determined in step 404 of method 400 and the volume of the food item. The RGO may be mounted on an oven rack, mounted on an interior surface of the oven cavity, and/or mounted in any other suitable position within the oven cavity such that the RGO is adjacent the food item(s). In some examples, the RGO is a distance between gratings in the oven rack.

Step 408 of method 400 includes receiving confirmation of each identified food item, foreign object, and/or cooking vessel in the oven cavity. The oven may request a user of the oven to confirm that the trained ML model has accurately identified the food items, foreign objects, and cooking vessels in the oven cavity. In some examples, the oven requests confirmation of the mass, and/or the volume of each food item determined by the image processing system. Mass or volume may be estimated in terms of standard units (e.g., pounds, ounces, kilograms, etc.) and/or in terms of size categories (e.g., small, medium, large). The oven may request the user of the oven to remove the foreign objects identified in the oven cavity to avoid cooking a non-food item. The oven may receive user confirmation through a user interface on the oven, and/or the oven may connect wirelessly to a mobile device of the user and receive confirmation through an app on the mobile device.

E. Illustrative Method for Cooking Similar Food Items Together

Figure 5:
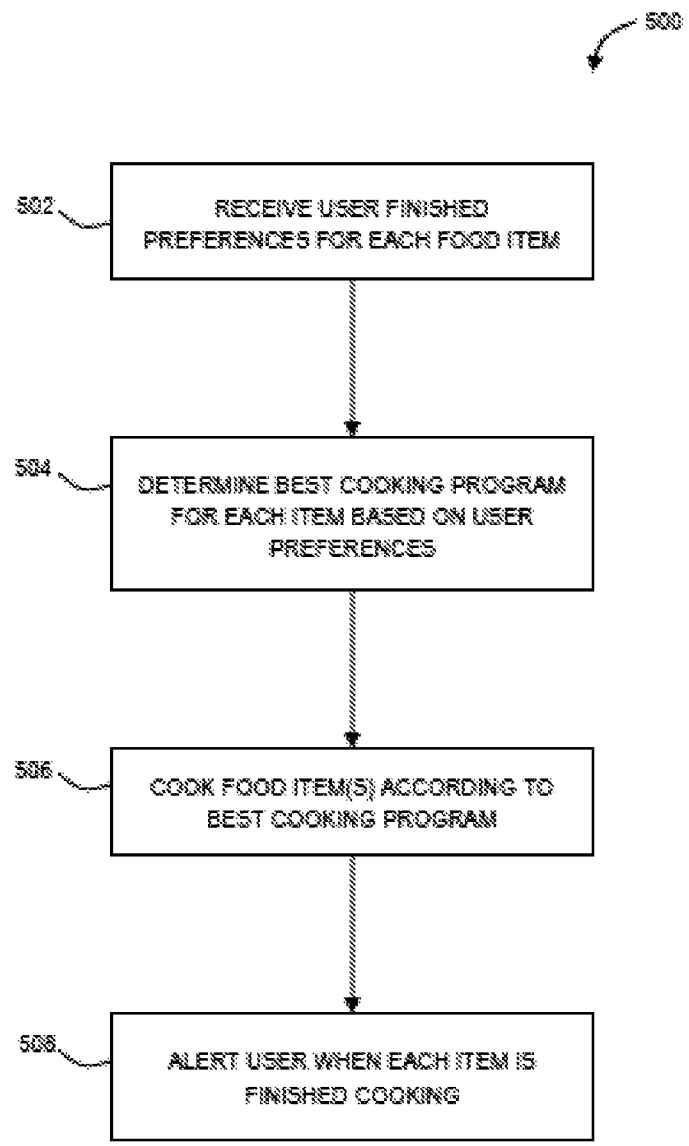
FIG. 5 is a flowchart depicting steps of an illustrative method for determining a cooking program for similar food items in accordance with aspects of the present disclosure.

This section describes steps of an illustrative method 500 for determining a cooking program for similar food item(s) identified in an oven utilizing an image processing system and a machine learning model; see FIG. 5. Method 500 is an extension of method 400 described above, if, for example, multiple similar food items are identified in the oven cavity in step 404 of method 400 (i.e., several food items in the oven are identified as the same type of food item, e.g., three chicken breasts). Aspects of oven 300 may be utilized in the method steps described below. Where appropriate, reference may be made to components and systems that may be used in carrying out each step. These references are for illustration, and are not intended to limit the possible ways of carrying out any particular step of the method.

FIG. 5 is a flowchart illustrating steps performed in an illustrative method, and may not recite the complete process or all steps of the method. Although various steps of method 500 are described below and depicted in FIG. 5, the steps need not necessarily all be performed, and in some cases may be performed simultaneously or in a different order than the order shown.

Step 502 of method 500 includes receiving from a user of the oven a finished preference or finished criteria for each of the similar food items identified in the oven cavity. The user of the oven may input their finished criteria for each identified food item through a user interface disposed on the oven or through an app on a mobile device of the user. Finished criteria may include a desired level of doneness of the food item (e.g., rare, medium rare, well done), a desired level of brownness of the food item, and/or a finished temperature of the food item. For example, two steaks are identified in the oven cavity, and the oven receives from the user a finished preference for one of the steaks to be cooked rare and the other steak to be cooked well-done.

Step 504 of method 500 includes determining an appropriate cooking program for the similar food items. Determining a cooking program for the similar food items may include determining a cooking mode (bake, broil, grill, etc.), a cooking temperature, a cooking duration, a time-based cooking algorithm (e.g., a changing temperature profile over time), and/or a condition-based cooking algorithm (e.g., having step-triggering criteria such as a level of browning) for the food items. The oven determines the appropriate cooking program for the food items using the identity, mass, volume, and/or user input finished criteria of the food items. Individual food items of the identified similar food items may require different cooking times based on differences in the mass, volume, and/or user input finished criteria for the particular food item and the oven uses this information to determine an appropriate cooking time for each of the food items. The oven may connect to cooking programs in the cloud or the cooking programs may be stored locally in the computer's memory. After determining the appropriate cooking program for the food items the oven may request user confirmation of the cooking program before proceeding to step 506.

Step 506 of method 500 includes cooking the food items according to the cooking program determined in step 504. In some examples, the oven prompts the user of the oven to insert a temperature probe into one or more of the food items prior to beginning the cooking process. The temperature probe may be wired to the oven or connect wirelessly to the oven to provide information about the internal temperature of the food item during the cooking process. In some examples, the oven uses the image processing system to monitor the cooking progress of the food items. The oven may monitor the level of brownness, internal temperature, mass, and/or volume of each individual food item. The oven may update the cooking program or finishing times for individual food items based on the observed cooking progress of the food items. In some examples, the oven displays live images of the food items in the oven cavity on the user interface of the oven, and/or on the user's mobile device, such that the user can observe the cooking progress of the food items without the need to open a door of the oven cavity. The user may manually update the cooking program according to observed cooking progress of the food items and the user's finished preferences for the food items.

Step 508 of method 500 includes alerting the user when each individual food item is finished cooking so that the user may remove the finished food item from the oven cavity. The oven may alert the user of the oven of the finished food item through the user interface on the oven, and/or through the app on the mobile device of the user. In some examples, the oven determines an individual food item is finished cooking when the measured finished criteria for the food item matches the user's input finished criteria for the food item. For example, if the user input finished criteria for a food item is an internal temperature of 150 degrees Fahrenheit, the oven would alert the user that the food item is finished cooking when the temperature probe inserted in the food item measures an internal temperature of the food item of 150 degrees Fahrenheit. In some examples, the oven alerts the user the food item is finished when the level of brownness, volume, and/or mass of the food item matches the user's input finished criteria for the food item.

F. Illustrative Method for Cooking Dissimilar Food Items

Figure 6:
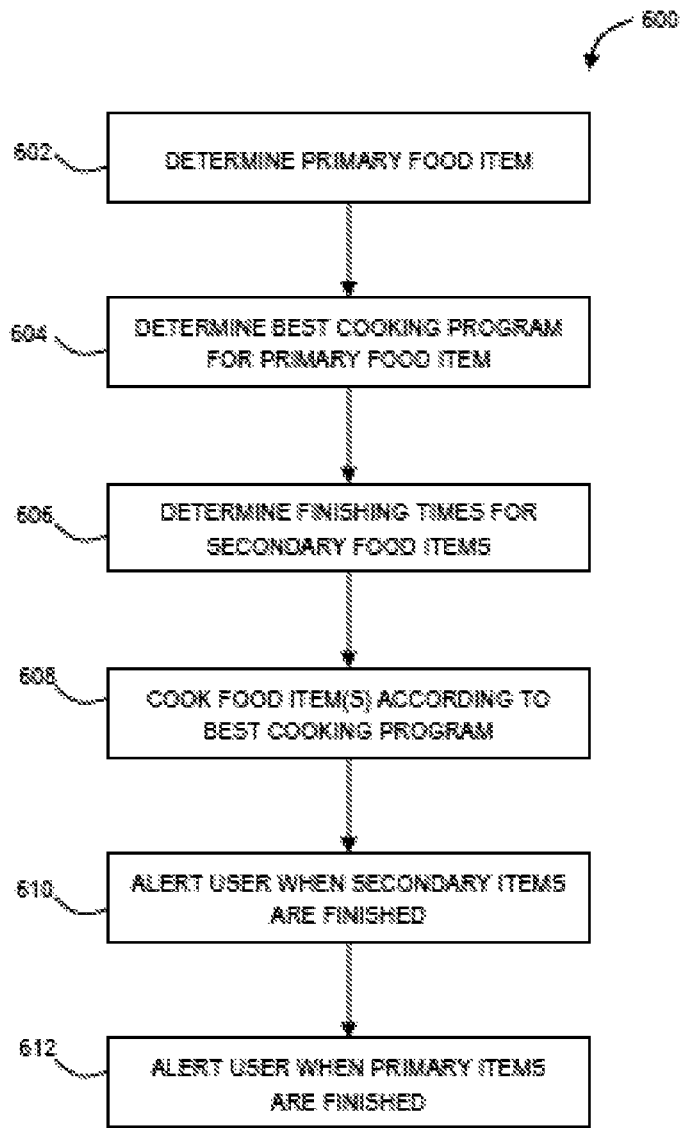
FIG. 6 is a flowchart depicting steps of an illustrative method for determining a cooking program for dissimilar food items in accordance with aspects of the present disclosure.

This section describes steps of an illustrative method 600 for determining a cooking program for dissimilar food item(s) in an oven utilizing an image processing system and trained machine learning model; see FIG. 6. Method 600 is an extension of method 400 described above if multiple food items are identified in the oven cavity in step 404 of method 400 when the food items are dissimilar food items (i.e., not all of the food items are identified as the same type of food item, e.g., a chicken breast and a potato casserole). Aspects of oven 300, may be utilized in the method steps described below. Where appropriate, reference may be made to components and systems that may be used in carrying out each step. These references are for illustration, and are not intended to limit the possible ways of carrying out any particular step of the method.

FIG. 6 is a flowchart illustrating steps performed in an illustrative method, and may not recite the complete process or all steps of the method. Although various steps of method 600 are described below and depicted in FIG. 6, the steps need not necessarily all be performed, and in some cases may be performed simultaneously or in a different order than the order shown.

Step 602 of method 600 includes determining a primary food item from the dissimilar food items identified in an oven cavity. The primary food item may be a food item that is potentially dangerous to consume if undercooked, and/or a food item that has a long cooking time relative to the other food item(s) identified in the oven cavity. For example, a chicken breast and a potato are identified in the oven cavity, and the oven identifies the chicken breast as the primary food item. In some examples, a list of common primary food items is stored in the memory of the oven and the oven determines the primary food item by matching one of the identified dissimilar food items to an item in the list. In some examples, the oven receives user input regarding which of the food items in the oven cavity is the primary food item.

Step 604 of method 600 includes determining an appropriate cooking program for the primary food item. Because the primary food item is potentially dangerous to consume if undercooked, the oven determines the appropriate cooking program for the dissimilar food items in the oven collectively based on the primary food item. Basing the suggested cooking program on the primary food item ensures that the primary food item will be cooked sufficiently to not be dangerous to consume. The appropriate cooking program for the primary food item is determined based on the identity, mass, and/or volume of the primary food item, and/or based on a cooking vessel containing the primary food item. In some examples, the oven receives from a user of the oven a finished preference for the primary food item and uses the user's finished preference in determining the appropriate cooking program. Determining the appropriate cooking program for the primary food item may include determining a cooking mode (bake, broil, grill, etc.), a cooking temperature, a cooking duration, a time-based cooking algorithm (e.g., a changing temperature profile over time), and/or a condition-based cooking algorithm (e.g., having step-triggering criteria such as a level of browning) for the primary food item.

Step 606 of method 600 includes determining a finishing time for secondary food items (i.e., non-primary food items) in the oven cavity based on the cooking program for the primary food item determined in step 604 of method 600. Based on the cooking mode, and/or cooking temperature of the cooking program for the primary food item the oven determines the finishing times for the secondary food items in the oven cavity. After determining the appropriate cooking program for the primary food items and finishing times for the secondary food items the oven may prompt the user of the oven to confirm the cooking program and finishing times determined by the oven prior to proceeding to step 608.

Step 608 of method 600 includes cooking the dissimilar food items according to the determined cooking program. In some examples, the oven prompts the user of the oven to insert a temperature probe into the primary food item prior to beginning the cooking process. The temperature probe may be wired to the oven or connect wirelessly to the oven to provide information about the internal temperature of the primary food item during the cooking process. In some examples, the oven uses the image processing system to monitor the cooking progress of the dissimilar food items. The oven may update the cooking program or finishing times for individual food items based on the observed progress of the food items. In some examples, the oven displays live images of the oven cavity on the user interface of the oven, and/or on the mobile device of the user, such that the user can observe the cooking progress of the food items without the need to open a door of the oven cavity. The user may manually update the cooking program according to observed cooking progress of the food items and the user's finished preferences for the food items.

Step 610 of method 600 includes alerting the user when the secondary food items are finished cooking. The user of the oven can remove the secondary food items from the oven cavity while the primary food item continues cooking.

Step 612 of method 600 includes alerting the user when the primary food item is finished cooking.

G. Illustrative Method for Monitoring Food Items During Cooking

Figure 7:
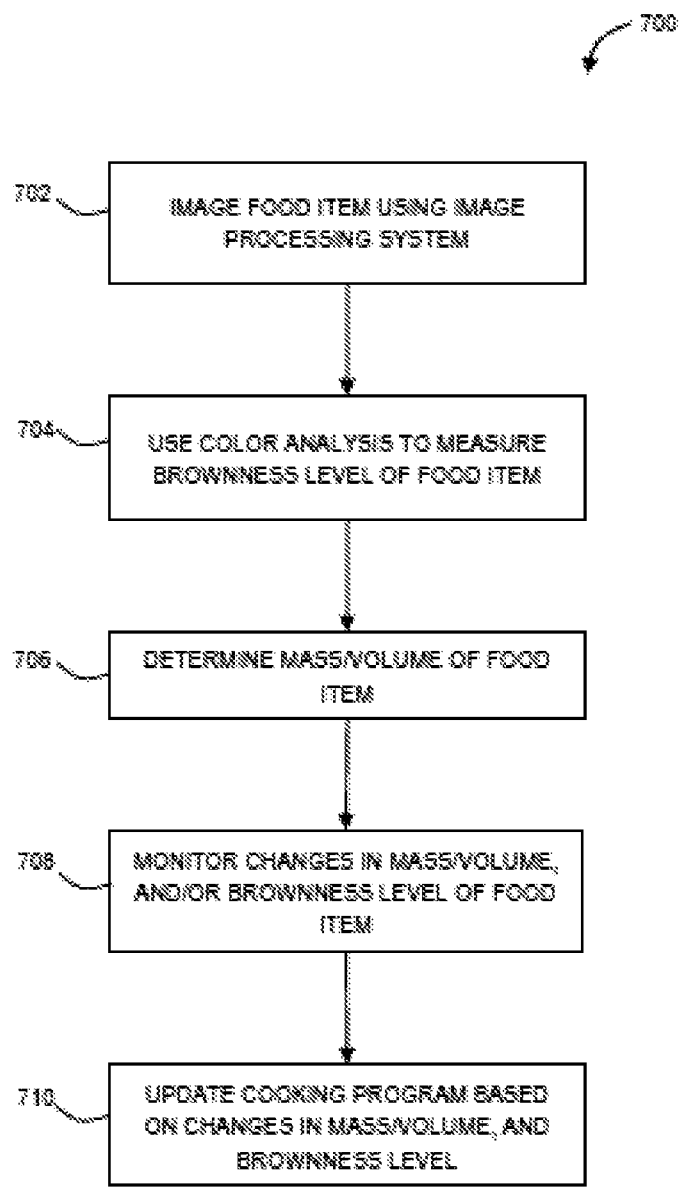
FIG. 7 is a flowchart depicting steps of an illustrative method for monitoring a food item being cooked in accordance with aspects of the present disclosure.

This section describes steps of an illustrative method 700 for monitoring a food item during a cooking process of the food item using an image processing system and Machine learning model; see FIG. 7. Aspects of oven 300, may be utilized in the method steps described below. Where appropriate, reference may be made to components and systems that may be used in carrying out each step. These references are for illustration, and are not intended to limit the possible ways of carrying out any particular step of the method.

FIG. 7 is a flowchart illustrating steps performed in an illustrative method, and may not recite the complete process or all steps of the method. Although various steps of method 700 are described below and depicted in FIG. 7, the steps need not necessarily all be performed, and in some cases may be performed simultaneously or in a different order than the order shown.

Step 702 of method 700 includes imaging a food item using the image processing system of the oven. The image processing system has an image sensor configured to take images of an interior of an oven cavity and a lighting element configured to illuminate the oven cavity. The lighting element is configured to provide lighting in the oven cavity such that a brownness level of the food item can be determined by the image processing system and compared to a brownness level of the food item measured at a different time.

Step 704 of method 700 includes measuring a brownness level of the food item utilizing color analysis of the images taken by the image sensor in step 702. The measured brownness level is stored in the memory of the oven to be compared to a brownness level of the food item later in the cooking process.

Step 706 of method 700 includes determining a volume, and/or mass of the food item. As described above, the volume of the food item is determined by comparing the size and position of the food item within a field of view of the image sensor to a known size and position of a reference geometry object within the field of view of the image sensor. The mass of the food item is determined based on the volume and the identity of the food item. The determined volume, and/or mass of the food item is stored in the memory of the oven to be compared to the volume, and/or mass of the food item later in the cooking process.

Step 708 of method 700 includes monitoring changes in the brownness level, mass, and/or volume of the food item during the cooking process. Some food items change in volume, mass, and/or brownness level throughout the cooking process. The oven may continuously or intermittently monitor the current brownness level, volume, and/or mass of the food items in the oven cavity and compare the current values to the values determined for the food items in steps 704 and 706 of method 700. In some examples, the oven only proceeds to step 710 of method 700 after the oven detects a change in the brownness level, volume, and/or mass of the food items at a threshold level.

Step 710 of method 700 includes updating the cooking program based on the detected changes in the brownness level, mass, and/or volume of the food item. Some food items change in volume, mass, and/or brownness level in predictable ways during the cooking process, such that the changes provide information about the cooking progress of the food item. In some examples, if changes in the brownness level, mass, and/or volume of the food item occur faster or slower than expected the oven reevaluates the cooking program for the food item. The oven may update the cooking program, and/or finishing times for the food item based on the detected changes to the food items during the cooking process.

H. Illustrative Method for Self-Cleaning Cycle Activation

Figure 8:
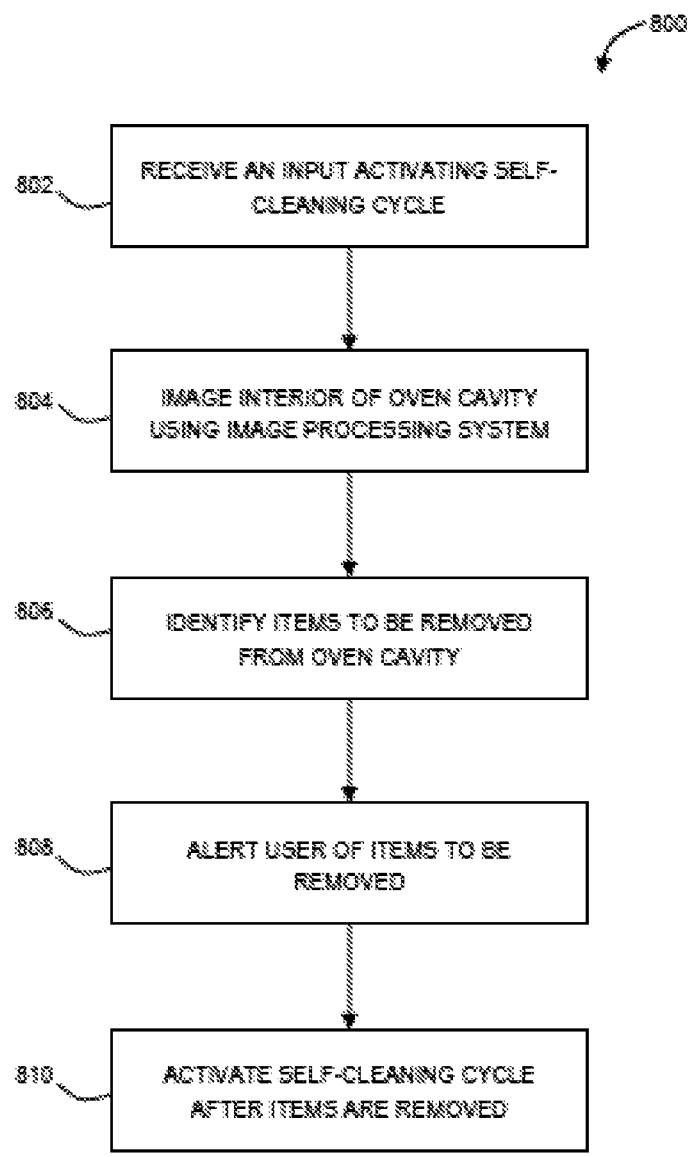
FIG. 8 is a flowchart depicting steps of an illustrative method for activating a self-cleaning cycle of an oven in accordance with aspects of the present disclosure.

This section describes steps of an illustrative method 800 for activating a self-cleaning cycle for an oven; see FIG. 8. Aspects of oven 300, be utilized in the method steps described below. Where appropriate, reference may be made to components and systems that may be used in carrying out each step. These references are for illustration, and are not intended to limit the possible ways of carrying out any particular step of the method.

FIG. 8 is a flowchart illustrating steps performed in an illustrative method, and may not recite the complete process or all steps of the method. Although various steps of method 800 are described below and depicted in FIG. 8, the steps need not necessarily all be performed, and in some cases may be performed simultaneously or in a different order than the order shown.

Step 802 of method 800 includes receiving an input activating a self-cleaning cycle of the oven. In some examples, the self-cleaning cycle includes a pyrolytic cleaning cycle in which the oven cavity is heated to temperatures in excess of 800 degrees Fahrenheit. A user of the oven may provide the input activating the self-cleaning cycle of the oven, the oven may automatically activate the self-cleaning cycle in response to detecting a buildup of debris, and/or the oven may automatically activate the self-cleaning cycle after a predetermined period of time has elapsed since the previous self-cleaning cycle of the oven.

Step 804 of method 800 includes imaging the interior of the oven cavity using an image processing system of the oven. The image processing system has an image sensor configured to take images of the interior of the oven cavity.

Step 806 of method 800 includes identifying any items in the oven cavity to be removed prior to activating the self-cleaning cycle. The image of the interior of the oven cavity is input into one or more machine learning models trained to detect items or objects within the oven cavity. Due to the high temperatures in the oven cavity during a self-cleaning cycle, many items would become deformed if left in the oven cavity during a self-cleaning cycle of the oven. Items that may need to be removed prior to activating the self-cleaning cycle to avoid deformation include, cookware, oven racks, and/or any foreign items disposed in the oven cavity.

Step 808 of method 800 includes alerting a user of the oven of any items to be removed from the oven cavity prior to activating the self-cleaning cycle. The user may be alerted through a user interface on the oven, through an app on their mobile device, and/or any other suitable medium.

Step 810 of method 800 includes activating the self-cleaning cycle of the oven after the items are removed from the oven. After notifying the user of the items to be removed from the oven, the oven may monitor the oven cavity using the image processing system and wait until the items are no longer detected in the oven cavity to activate the self-cleaning cycle. In some examples, the user of the oven may bypass the need to remove the items prior to the activation of the self-cleaning cycle with the understanding that any damages to the items left in the oven cavity during the self-cleaning cycle are the responsibility of the user.

I. Illustrative Method for Detecting Debris Buildup

Figure 9:
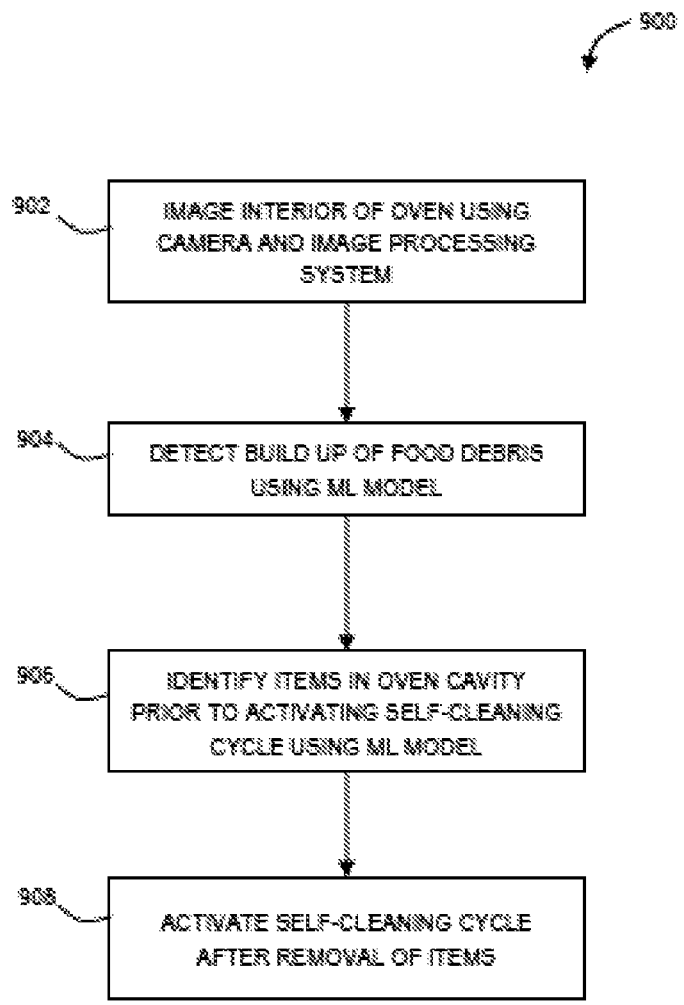
FIG. 9 is a flowchart depicting steps of an illustrative method for detecting a buildup of debris in accordance with aspects of the present disclosure.

This section describes steps of an illustrative method 900 for detecting a buildup of debris in an oven cavity and activating a self-cleaning cycle; see FIG. 9. Aspects of oven 300, may be utilized in the method steps described below. Where appropriate, reference may be made to components and systems that may be used in carrying out each step. These references are for illustration, and are not intended to limit the possible ways of carrying out any particular step of the method.

FIG. 9 is a flowchart illustrating steps performed in an illustrative method, and may not recite the complete process or all steps of the method. Although various steps of method 900 are described below and depicted in FIG. 9, the steps need not necessarily all be performed, and in some cases may be performed simultaneously or in a different order than the order shown.

Step 902 of method 900 includes imaging an interior of the oven cavity using an image processing system. The imaging processing system has an image sensor configured to take images of the interior of the oven cavity.

Step 904 of method 900 includes detecting a buildup of debris on the interior of the oven cavity using one or more machine learning model. The buildup of debris is detected by inputting the images captured by the image sensor into the one or more machine learning models trained to identify buildup of debris on surfaces in the interior of the oven cavity. If left undisturbed the debris may burn into the surfaces of the interior of the oven cavity causing permanent damage to the oven. In some examples, the machine learning model is trained to detect a buildup of debris on the interior of the oven cavity above a predetermined threshold level.

Step 906 of method 900 includes identifying items to be removed from the oven cavity prior to activating the self-cleaning cycle. The image of the oven cavity is input into one or more machine learning models trained to detect items or objects in the image of the oven cavity. The one or more machine learning models trained to detect the items or objects may be the same or different than the machine learning models used to detect the buildup of debris in the oven cavity. Certain objects identified by the machine learning model may be deformed if left in the oven cavity during the self-cleaning cycle. In some examples, the oven may store in the memory of the oven a list of common items that may be damaged if left in the oven cavity during a self-cleaning cycle of the oven. The oven may alert the user of the items detected by the one or more machine learning models to be removed from the oven cavity prior to activating the self-cleaning cycle.

Step 908 of method 900 includes activating a self-cleaning cycle after any items detected in step 906 have been removed from the oven cavity. In some examples, the oven is configured to begin the self-cleaning cycle only after items detected by the image processing system are removed from the oven. In some examples, the user can bypass the removal of the items in the oven and activate the self-cleaning cycle with the understanding that any items left in the oven cavity and damaged during the self-cleaning cycle are the responsibility of the user.

J. Illustrative Combinations and Additional Examples

This section describes additional aspects and features of an oven, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A method for determining a cooking program for a food item disposed in a cavity of an oven, comprising;
  imaging an interior of the oven cavity using an image sensor;
  inputting the image of the interior of the oven cavity into a machine learning (ML) model trained to detect the food item in the oven cavity and output an identity of the food item;
  determining a volume of the identified food item based on the image of the interior of the oven cavity and estimating a mass of the food item based on the volume of the food item and the identity of the food item;
  receiving a finished preference for a cooking parameter for the food item;
  using the food item identity, the mass, and the finished preference for the cooking parameter to determine an appropriate cooking program for the food item; and
  cooking the food item according to the appropriate cooking program.

A1. The method of paragraph A0, further comprising receiving a user input confirming the food item identity determined by the machine learning model.

A2. The method of paragraph A0 or A1, further comprising monitoring the cooking parameter of the food item during the cooking process.

A3. The method of paragraph A2, wherein the cooking parameter is a brownness level of the food item.

A4. The method of paragraph A2, wherein the cooking parameter is a volume of the food item.

A5. The method of paragraph A2, further comprising updating the cooking program in response to detecting a change in the cooking parameter of the food item and cooking the food item according to the updated cooking program.

A6. The method of any one of paragraphs A0 through A5, wherein the machine learning model is further trained to detect a non-food item in the oven cavity and to refrain from cooking the food item until after removal of the non-food item from the oven cavity.

A7. The method of any one of paragraphs A0 through A6, wherein determining the volume of the food item is based on an apparent geometric dimension of the food item in the image of the interior of the oven cavity and a known geometric dimension of a reference object disposed in the image of the interior of the oven cavity.

A8. The method of any one of paragraphs A0 through A7, further comprising identifying using the machine learning model multiple similar food items in the oven cavity and receiving from a user of the oven a finished preference for a cooking parameter for each individual food item.

A9. The method of any one of paragraphs A0 through A7, further comprising:
  identifying using the machine learning model dissimilar food items in the oven cavity; and
  automatically choosing a primary food item from the dissimilar food items.

A10. The method of paragraph A9, further comprising determining an appropriate cooking program for the primary food item and cooking the dissimilar food items together according to the selected cooking program for the primary food item.

A11. The method of any one of paragraphs A0 through A10, further comprising identifying a cooking vessel containing the food item using the trained ML model.

A12. The method of paragraph A11, further comprising determining the appropriate cooking program for the food item based on the identity of the food item and based on a cooking property of the cooking vessel containing the food item.

A13. The method of any one of paragraphs A0 through A12, further comprising detecting a buildup of debris on the interior of the oven cavity using the machine learning model and activating a self-cleaning cycle of the oven in response to detecting the buildup of debris.

B0. A method for determining a cooking program for a plurality of food items disposed in a cavity of an oven, the method comprising;
  imaging an interior of the oven cavity using an image sensor;
  inputting the image of the interior of the oven cavity into a machine learning model trained to detect food items in the oven cavity and output an identity of each of the food items;
  determining a primary food item from the plurality of food items disposed in the oven cavity;
  selecting a cooking program based on cooking the primary food item; and
  cooking the multiple food items according to the cooking program selected for the primary food item.

B1. The method of paragraph B0, further comprising receiving a finished preference for a cooking parameter for the primary food item and determining the appropriate cooking program based on the finished preference for the cooking parameter.

B2. The method of paragraph B0 or B1, further comprising monitoring a cooking parameter of the primary food item during the cooking process.

B3. The method of paragraph B2, wherein the cooking parameter of the primary food item is a brownness level of the primary food item.

B4. The method of paragraph B2, wherein the cooking parameter of the primary food item is a volume of the primary food item.

B5. The method of paragraph B2, further comprising updating the appropriate cooking program in response to detecting a change in the cooking parameter for the primary food item and cooking the plurality of food items according to the updated cooking program.

B6. The method of any one of paragraphs B0 through B5, further comprising identifying a non-food item in the oven cavity and beginning to cook the food items after the non-food item is removed from the oven cavity.

B7. The method of any one of paragraphs B0 through B6, further comprising determining a volume of the primary food item using the image of the interior of the oven cavity and estimating a mass of the primary food item based on the volume, and identity of the primary food item.

C0. A method for cooking a plurality of food items, the method comprising:
  generating an image of an interior of an oven cavity containing a plurality of food items, using an image sensor;

using one or more machine learning models trained to output an identity and count of each of the food items based on the image of the interior of the oven cavity;

determining a primary food item of the plurality of food items disposed in the oven cavity;

selecting a cooking program based on cooking the primary food item; and cooking the multiple food items according to the cooking program selected for the primary food item.

C1. The method of C0, further comprising receiving a user preference for a cooking parameter for the primary food item and determining the appropriate cooking program based on the user preference for the cooking parameter.

C2. The method of C1, wherein the user preference comprises a final internal temperature of the primary food item.

C3. The method of any one of paragraphs C0 through C2, further comprising monitoring a cooking parameter of the primary food item during the cooking process.

C4. The method of C3, wherein the cooking parameter of the primary food item is a brownness level of the primary food item.

C5. The method of C3, wherein the cooking parameter of the primary food item is a volume of the primary food item.

C6. The method of C3, further comprising:

updating the cooking program in response to detecting a change in the cooking parameter for the primary food item; and cooking the plurality of food items according to the updated cooking program.

C7. The method of any one of paragraphs C0 through C6, further comprising identifying a non-food item in the oven cavity and refraining from cooking the food items while the non-food item is present in the oven cavity.

C8. The method of any one of paragraphs C0 through C7, further comprising determining a volume of the primary food item using the image of the interior of the oven cavity and estimating a mass of the primary food item based on the volume, and identity of the primary food item.

C9. The method of any one of paragraphs C0 through C8, wherein the plurality of food items comprises more than one of a same food item.

D0. An oven, comprising:

an oven body including an oven cavity having one or more heating elements and a selectively openable door;

an imaging device coupled to the oven body, such that the imaging device is configured to generate images of an interior of the oven cavity; and an electronic controller configured to selectively control the one or more heating elements to heat the oven cavity, the electronic controller including processing logic configured to:

use one or more machine learning models trained to output an identity and count of each of several food items disposed in the oven cavity, based on one or more images of the interior of the oven cavity generated by the imaging device;

determine a primary food item of the plurality of food items disposed in the oven cavity;

select a cooking program based on cooking the primary food item; and cook the several food items according to the cooking program selected for the primary food item.

D1. The oven of D0, wherein the processing logic is further configured to:

receive a user preference for a cooking parameter for the primary food item; and determine the appropriate cooking program based on the user preference for the cooking parameter.

D2. The oven of D1, wherein the user preference comprises a final internal temperature of the primary food item.

D3. The oven of any one of paragraphs D0 through D2, wherein the processing logic is further configured to monitor a cooking parameter of the primary food item during the cooking process.

D4. The oven of D3, wherein the cooking parameter of the primary food item is a brownness level of the primary food item.

D5. The oven of D3, wherein the cooking parameter of the primary food item is a volume of the primary food item.

D6. The oven of D3, wherein the processing logic is further configured to:

update the cooking program in response to detecting a change in the cooking parameter for the primary food item; and cook the plurality of food items according to the updated cooking program.

D7. The oven of any one of paragraphs D0 through D6, wherein the processing logic is further configured to identify a non-food item in the oven cavity and refrain from cooking the food items while the non-food item is present in the oven cavity.

D8. The oven of any one of paragraphs D0 through D7, wherein the oven further comprises a reference geometry object disposed in the oven cavity and having at least one known dimension and position, such that the reference geometry object is present in the image of the interior of the oven cavity; and the processing logic is further configured to:

determine a volume of the primary food item using the image of the interior of the oven cavity;

and estimate a mass of the primary food item based on the volume and the identity of the primary food item.

D9. The method of any one of paragraphs D0 through D8, wherein the plurality of food items comprises more than one of a same food item.

Advantages, Features, and Benefits

The different embodiments and examples of the oven described herein provide several advantages over known solutions for ovens providing image processing systems and food identification. For example, illustrative embodiments and examples described herein allow an oven to use an image processing system to take images of an interior of a cavity of the oven and input the images taken by the image processing system into a machine learning model trained to identify food item(s), cooking vessel(s), foreign object(s), and/or buildup of debris in the oven cavity from the image of the oven cavity taken by the image processing system. Identifying food item(s), cooking vessel(s), foreign object(s), and/or buildup of debris in the oven cavity using the trained machine learning model facilitates the automation of various oven processes.

Additionally, and among other benefits, illustrative embodiments and examples described herein allow an oven to suggest a cooking program for a food item to a user of the oven based on an identity of the food item, properties of a cooking vessel containing the food item, a volume and mass of the food item, and/or the user's finished preferences for the food item. The oven determines a cooking program for a single food item, multiple similar food items, and/or dissimilar food items to be cooked simultaneously. Having the oven automatically determine the cooking program for the identified food item may simplify the cooking process for the user of the oven and improve the quality of the cooked food item.

Additionally, and among other benefits, illustrative embodiments and examples described herein include an oven that automatically determines an appropriate cooking program to cook dissimilar food items in the oven cavity simultaneously. In some examples, the oven identifies a primary food item from the dissimilar food items that are present, and determines the appropriate cooking program based on the primary food item. In this example, the oven determines finishing times for the non-primary food items based on the appropriate cooking program for the primary food item. In this example, the oven alerts a user of the oven when the non-primary food items are finished cooking, and when the primary food item is finished cooking. By identifying the appropriate cooking program for the primary food item and the finishing times for the secondary food items, it is possible for the oven to successfully cook various combinations of dissimilar food items simultaneously.

Additionally, and among other benefits, illustrative embodiments and examples described herein include an oven configured to cook similar food items with different finishing preferences for each item simultaneously. For example, two steaks are identified in the oven cavity and the oven receives from a user a finished preference for one steak to be cooked rare and the other steak to be cooked well-done. The oven determines an appropriate cooking program to cook the two steaks simultaneously and a cooking time for each steak individually based on the user's finished preference. The oven may alert the user when the steak to be cooked rare is finished cooking, and when the steak to be cooked well-done is finished cooking. By determining a finishing time for each food item individually, it is possible to cook many similar food items simultaneously and have each individual food item cooked according to a different finished preference for the food item.

Additionally, and among other benefits, illustrative embodiments and examples described herein allow an oven to determine a volume and mass of a food item using only the image processing system. The oven determines mass of the food item based on the volume and the identity of the food item determined using images taken by the image sensor of the image processing system. The oven does not require an additional sensor (e.g., a scale) to determine the mass of the food item. The mass of the food item is useful in determining an appropriate cooking program for the food item and the volume of the food item is useful in monitoring changes to the food item during the cooking process. A user of the oven may be more likely to trust a cooking program suggested by the oven if the oven determines and displays the correct mass of the food item.

Additionally, and among other benefits, illustrative embodiments and examples described herein monitor an internal temperature, a brownness level, and/or a volume and mass of a food item during the cooking process, and update a cooking program for the food item based on observed cooking progress of the food item. For example, if the oven detects the internal temperature of the food item is increasing faster than expected, the oven may update the cooking program to decrease the temperature of the oven, and/or decrease the expected cooking time for the food item. Updating the cooking program based on the observed cooking progress of the food item ensures the food item is being cooked properly and may improve the quality of the cooked food item.

Additionally, and among other benefits, illustrative embodiments and examples described herein allow an oven to detect foreign objects or objects in the oven cavity unlikely to be desired to be cooked. The oven may not begin a cooking program, and/or self-cleaning cycle if a foreign object is detected in the oven cavity. In some examples, the oven prompts the user of the oven to remove the foreign object prior to beginning a cooking program, or self-cleaning cycle. Refraining from beginning a cooking program and/or self-cleaning cycle until the foreign objects are removed from the oven may improve the safety of the oven and avoid causing damage to the foreign objects.

Additionally, and among other benefits, illustrative embodiments and examples described herein allow an oven to detect debris buildup on an interior surface of the oven cavity. In response to detecting the buildup of debris in the oven cavity, the oven may prompt a user of the oven to activate a self-cleaning cycle, and/or automatically activate a self-cleaning cycle prior to the debris being burned into the interior surface of the oven cavity and causing permanent damage.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. An oven, comprising:
an oven body including an oven cavity having one or more heating elements and a selectively openable door;
an imaging device coupled to the oven body, such that the imaging device is configured to generate images of an interior of the oven cavity; and
an electronic controller configured to selectively control the one or more heating elements to heat the oven cavity, the electronic controller including processing logic configured to:
use one or more machine learning models trained to output an identity and count of each of a plurality of food items disposed in the oven cavity, based on one or more images of the interior of the oven cavity generated by the imaging device;

determine a primary food item of the plurality of food items disposed in the oven cavity;
select a cooking program based on cooking the primary food item; and
cook the plurality of food items according to the cooking program selected for the primary food item.

2. The oven of claim 1, wherein the processing logic is further configured to:
receive a user preference for a cooking parameter for the primary food item; and
determine an appropriate cooking program based on the user preference for the cooking parameter.

3. The oven of claim 2, wherein the user preference comprises a final internal temperature of the primary food item.

4. The oven of claim 1, wherein the processing logic is further configured to monitor a cooking parameter of the primary food item during a cooking process.

5. The oven of claim 4, wherein the cooking parameter of the primary food item is a brownness level of the primary food item.

6. The oven of claim 4, wherein the cooking parameter of the primary food item is a volume of the primary food item.

7. The oven of claim 4, wherein the processing logic is further configured to:
update the cooking program in response to detecting a change in the cooking parameter for the primary food item; and
cook the plurality of food items according to the updated cooking program.

8. The oven of claim 1, wherein the processing logic is further configured to identify a non-food item in the oven cavity and refrain from cooking the food items while the non-food item is present in the oven cavity.

9. The oven of claim 1, wherein the oven further comprises a reference geometry object disposed in the oven cavity and having at least one known dimension and position, such that the reference geometry object is present in the one or more images of the interior of the oven cavity; and
the processing logic is further configured to:
determine a volume of the primary food item using the one or more images of the interior of the oven cavity; and estimate a mass of the primary food item based on the volume and the identity of the primary food item.

10. The oven of claim 1, wherein the plurality of food items comprises more than one of a same food item.

* * * * *